United States Patent [19]

Mills

[11] 4,243,643

[45] Jan. 6, 1981

[54] METALLIC ION REMOVAL FROM PHOSPHORIC ACID

[75] Inventor: Harold E. Mills, Lake City, Fla.

[73] Assignee: Occidental Chemical Company, Houston, Tex.

[21] Appl. No.: 954,647

[22] Filed: Oct. 25, 1978

Related U.S. Application Data

[63] Continuation-in-part of Ser. No. 810,484, Jun. 27, 1977, Pat. No. 4,136,199.

[51] Int. Cl.$^2$ ............................................. C01B 25/18
[52] U.S. Cl. ................................... 423/319; 423/126; 423/163; 423/321 R
[58] Field of Search ................... 423/321 R, 319, 126, 423/163, 317, 497

[56] References Cited

U.S. PATENT DOCUMENTS 4,136,199  1/1979  Mills .................................. 423/321 R Primary Examiner—Wayne A. Langel
Attorney, Agent, or Firm—Christie, Parker & Hale

[57] ABSTRACT

Metal ion impurities are removed from phosphoric acid by adding to the acid a precipitant comprising ions of calcium and fluorine to cause precipitation of a magnesium-containing precipitate. A preferred precipitant is one containing calcium flouride, such as the sludge obtained by treating pond water from a phosphoric acid plant with a calcium-containing compound. Preferably, the soluble sulfate content of the phosphoric acid is maintained at at least about 2% by weight. An animal feed can be prepared from the precipitate by combining the precipitate with phosphate rock, water, and a sodium-containing compound, and then calcining the combination.

48 Claims, 3 Drawing Figures

METALLIC ION REMOVAL FROM PHOSPHORIC ACID

CROSS-REFERENCES

This application is a continuation-in-part of U.S. patent application Ser. No. 810,484, filed June 27, 1977 now U.S. Pat. No. 4,136,199, which is incorporated herein by this reference.

BACKGROUND

This invention relates to a method for removing impurities, such as magnesium, from wet process phosphoric acid.

Phosphoric acid has been prepared by the wet process method for many years. The wet process involves the reaction of phosphatic solid materials, hereinafter termed phosphate rock, with sulfuric acid, usually in a slurry of phosphate rock and calcium sulfate in phosphoric acid. The sulfuric acid reacts exothermically with the phosphate rock to produce a slurry of phosphoric acid and calcium sulfate. The phosphoric acid is separated from the calcium sulfate by filtering.

The names of three processes for producing phosphoric acid are based upon the by-product calcium sulfate produced, namely, the gypsum or dihydrate process, the hemihydrate process, and the anhydrite process. The type of by-product produced is dependent upon the temperature of the system and the $P_2O_5$ concentration of the liquid. Other factors, such as fluorine concentration, alumina concentration, and sulfuric acid concentration, play a less important role. As used herein, "calcium sulfate" refers to all three types of calcium sulfate, i.e., gypsum, hemihydrate, and anyhydrite.

Gypsum, $CaSO_4 \cdot H_2O$, is the by-product formed when the wet process is run at a temperature of 90° C. or less and a $P_2O_5$ concentration of about 30% in the liquid portion of the slurry. Increasing the temperature to about 90° to 120° C. and the $P_2O_5$ concentration to about 40% in the liquid phase yields hemihydrate, $CaSO_4 \cdot 1/2H_2O$. The phosphoric acid produced by the hemihydrate process, before any concentration, typically has a $P_2O_5$ content greater than 38% by weight. $CaSO_4$, anhydrite, is produced at temperatures of about 130° C. at $P_2O_5$ concentrations greater than 30%. This latter process is most difficult to run due to severe corrosion at the higher temperatures and the instability of the anyhydrite during processing.

A detailed description of a method for producing phosphoric acid by the dihydrate process can be found in U.S. patent application Ser. No. 909,899, filed by Fernando Oré, John David Ellis, and James Harold Moore, entitled "Phosphoric Acid Processed with High Circulation Rates", which is a continuation-in-part of U.S. patent application Ser. No. 703,138, filed July 7, 1976 now abandoned. Both of these applications are incorporated herein by this reference.

A process for preparing phosphoric acid by the hemihydrate process is described in U.S. patent application Ser. No. 865,556, filed Dec. 29, 1977, by Fernando N. Oré, John David Ellis, and James Harold Moore, entitled "Hemihydrate Type Phosphoric Acid System", which is a continuation-in-part of application Ser. Nos. 703,139 and 703,138, both of which were filed on July 7, 1976. All three of these applications are incorporated herein by this reference.

When phosphoric acid is made by any of these processes, impurities in the rock are dissolved and are present in the resulting phosphoric acid. The principal impurities which are difficult to remove are compounds and complexes containing calcium, aluminum, silicon, fluorine, sulfate, and magnesium. Removal of these impurities is important because the phosphoric acid is usually concentrated up to about 48 to 54 weight percent $P_2O_5$ and, during storage, the impurities can precipitate to form a solid which is found objectionable by most customers.

Many attempts have been made to remove impurities from wet process phosphoric acid. Exemplary of the techniques used are those described in U.S. Pat. Nos. 3,124,419; 3,206,282; 3,273,713; 3,379,501; 3,442,609; 3,481,700; and 3,642,439; and British Patent Nos. 467,843 and 1,337,669. Methods described in these patents generally are complicated, difficult to use, and in many cases are ineffective for removing magnesium-containing impurities. In addition, none of the methods described in these patents involves a commercial use for the precipitate formed in removing the impurities from phosphoric acid.

Therefore, there is a need for a simple, inexpensive, and effective method for removing impurities, such as magnesium, from wet process phosphoric acid, and there is a need for a method which converts the precipitate formed into a useful product.

SUMMARY

The present invention is directed to a method with the above features. According to this method, a solid precipitate comprising calcium ions and fluoride ions is added to phosphoric acid. Preferably, the precipitate comprises at least 50% by weight calcium ions and fluoride ions in combination and has a molar ratio of calcium to fluoride ions of about 1:2. The solid precipitant can comprise precipitated sludge obtained by treatment of wet process phosphoric acid plant pond water with a calcium-containing compound which yields a solid precipitant which contains calcium and fluorine and having a dry basis analysis of at least 20% by weight calcium oxide and at least 19% by weight F, the latter present as fluorides.

After the addition of the precipitant, a precipitate containing an impurity is allowed to form. This can be effected by maintaining the phosphoric acid at a temperature in the range of about 115° to about 170° F., where the acid is aged for about one to about seven days. At least a portion of the precipitate formed is separated from the acid.

It has been found that for optimum precipitation of magnesium from phosphoric acid, preferably the soluble sulfate content of the phosphoric acid is maintained at at least about 2% by weight.

The precipitate formed can be used to prepare an animal feed by combining the precipitate with phosphate rock, water, and a sodium-containing compound, such as sodium carbonate, and then calcining the combination to reduce the fluorine content of the combination. The product is a valuable, nutritious animal feed.

This method for removing an impurity from phosphoric acid is easy to use, efficient in removing magnesium from phosphoric acid, and highly effective. In addition, the precipitate formed by this method can be converted into a valuable by-product.

DRAWINGS

These and other features, aspects, and advantages of the present invention will become better understood with reference to the following description, appended claims, and accompanying drawings, where:

DESCRIPTION

Figure 1:
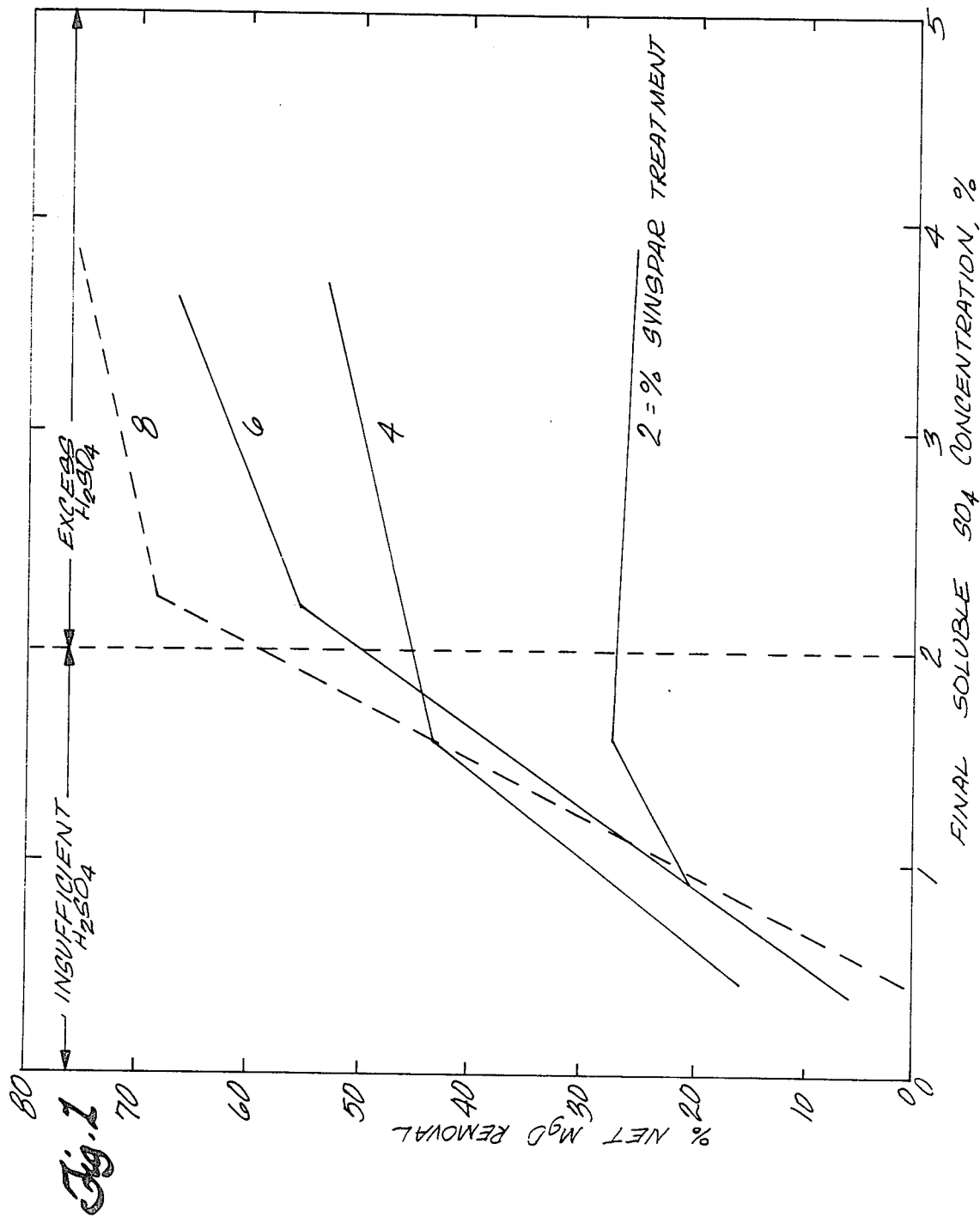
FIG. 1 is a graph of percent net magnesium oxide removal versus final soluble sulfate concentration of phosphoric acid treated with different concentrations of a calcium and fluorine containing precipitant in accordance with principles of the present invention.

In the present invention, at least one metallic ion impurity, such as divalent magnesium and/or trivalent aluminum, can be removed from phosphoric acid by adding to the acid a solid precipitant comprising calcium and fluoride ions. The acid with the precipitant added is allowed to age at an elevated temperature for sufficient time for the formation of a precipitate containing the impurity. Then, at least a portion of the precipitate is separated from the phosphoric acid.

This technique is effective for phosphoric acid containing from 38 to about 54% by weight $P_2O_5$, including phosphoric acids produced by both the hemihydrate and dihydrate processes. Phosphoric acid produced by the dihydrate process requires concentration, such as by evaporation of water from the acid to raise the $P_2O_5$ content to 38% by weight. Phosphoric acid produced by the hemihydrate process can be treated by the method of this invention directly from a filtration operation without requiring any concentration, although the acid can be concentrated, if desired.

Both of these types of phosphoric acid contain many impurities, such as divalent magnesium, calcium, iron, trivalent aluminum, sodium, silicon, fluorine, sulfate, and other impurities. Typically, these acids contain from about 0.3 to about 1.75% by weight MgO. The amount and type of impurities in hemihydrate process phosphoric acid can be different than the amount and type of impurities in dihydrate process phosphoric acid.

Preferably, the precipitant used contains at least 50% by weight calcium and fluoride ions in combination to achieve fast and effective removal of impurities from the phosphoric acid. Preferably, the molar ratio of calcium to fluoride ions in the precipitant is about 1:2, i.e., the precipitant contains calcium fluoride. A preferred precipitant is the sludge obtained by adding a calcium compound, such as calcium carbonate or calcium hydroxide, to wet process phosphoric acid plant pond water. Techniques for producing such a sludge are described in U.S. Pat. Nos. 2,780,523; 2,976,119; 3,151,938; 3,625,648; and 3,907,978.

The preferred method for producing such a sludge is described in U.S. patent application Ser. No. 863,085, filed Dec. 22, 1977, which is incorporated herein by this reference. The sluge prepared by this method,* which is referred to herein as "Synspar", typically contains about 50% by weight water. On a dry basis by weight, the solids in the sludge analyze: P, 3 to 10% (probably present as $PO_4$); Mg, 0.05 to 0.3%; Ca, 20 to 35%; Fe, 0.3 to 3.0%; Al, 1 to 5%; Na, 0.7 to 3.0%; Si, 0.5 to 8.0%; F, 13 to 30%; and $SO_4$, 3 to 15%. It has been found that such Synspar is only slightly soluble in phosphoric acid, where the fluoride values in the Synspar are only slowly released to the phosphoric acid to be available for forming a precipitate. This is in contrast to prior art methods where a soluble fluoride salt or hydrogen fluoride is added to the phosphoric acid to precipitate impurities.

*i.e. the precipitate from either stage of Ca compound addition, or the combined precipitates, typically the combined precipitates.

After the addition of the precipitant, the phosphoric acid is maintained at an elevated temperature of at least about 115° F. to speed up the precipitation of impurities. The phosphoric acid is maintained at a temperature less than about 170° F., preferably less than about 160° F., to avoid excessively high energy costs and avoid scaling and corrosion problems. More preferably, the acid is maintained at an elevated temperature of from about 115° to about 140° F. The acid is maintained at such an elevated temperature for about one to about seven days to precipitate the impurities. Preferably, it is aged for at least about two days to precipitate a high proportion of the impurities in the phosphoric acid. Generally, six days of aging is sufficient, and preferably the amount of precipitant added and the temperature of aging are controlled so that aging can be limited to about two to about four days.

X-ray difraction studies of the "salt" precipitated from the acid show the major phase to be a type of Ralsonite, $Na_xMg_4Al_{2-X}$ (F, OH)$_6H_2O$. From 25 to about 70% weight of the magnesium and from about 5 to about 25% by weight of the aluminum present in the untreated phosphoric acid are precipitated.

The precipitate can be separated from the treated wet process phosphoric acid by conventional techniques. A preferred technique is vacuum filtration, such as described in U.S. patent application Ser. No. 827,741, filed Aug. 25, 1977, and incorporated herein by this reference.

Preferably, the soluble sulfate content of the phosphoric acid is maintained at at least about 2% by weight for fast and effective removal of magnesium from the phosphoric acid. This can be effected by adding sulfuric acid to the phosphoric acid. Generally, an amount of sulfuric acid approximately equal to stoichiometric to the fluorine added can reduce the precipitation time by about 40 to about 50%. The importance of maintaining a soluble sulfate concentration of the phosphoric acid at at least about 2% by weight is shown by FIG. 1. This figure shows the results of tests where different amounts of sulfuric acid were added to hemihydrate acid treated by the addition of Synspar in the amounts of 2, 4, 6, and 8% by weight of the phosphoric acid. For each of these four levels of addition of Synspar, the figure shows the percent of MgO removal versus the final soluble $SO_4$ concentration, percent by weight, of the phosphoric acid. The acid before the addition of Synspar and sulfuric acid contained 1.89% by weight soluble $SO_4$. The acid was aged at 160° F. for six days. The four curves in FIG. 1 show the importance of having a soluble sulfate content in hemihydrate phosphoric acid of at least about 2% by weight. It is evident from FIG. 1 that removal of magnesium is curtailed severely when the soluble sulfate concentration is below 2%. The same figure also shows that addition of sulfuric acid to a level much higher than 2% is essentially wasted.

Equation 1 below, the "Sulfuric Acid Predictor Equation", can be used to estimate the optimum sulfuric acid addition, i.e., the amount required to maintain, but not exceed, 2% H$_2$SO$_4$ during treatment with a fluorine containing precipitant. The equation has been successfully used when Synspar was used as the precipitant. It takes into account the initial sulfuric concentration, as well as the amount stoichiometrically consumed by reaction with Synspar.

Sulfuric Acid Predictor Equation $$\Delta[H_2SO_4] = 2.0 - [H_2SO_4]_o + \frac{98}{(38)(100)} \cdot [SNS] \, \partial F]_{SNS} \quad (1)$$

where, $\Delta[H_2SO_4]$ is the amount of H$_2$SO$_4$ (100% basis) to be added expressed as a weight % of the phosphoric acid to be treated.

2.0 is the desired [H$_2$SO$_4$] final;

[H$_2$SO$_4$]$_o$ is the initial soluble H$_2$SO$_4$, weight %;

[SNS] is the amount of Synspar to be added (dry basis) expressed as weight % of the phosphoric acid to be treated; and

[F]$_{SNS}$ is the dry basis weight % of F in the Synspar.

Equation 1 is applicable both to hemi- and di-acids in the 46 to 54% P$_2$O$_5$ range. Often it predicts $\Delta[H_2SO_4] \leq 0$ with dihydrate acid, indicating that sufficient sulfuric acid is in solution and none should be added. In summary, to remove magnesium impurities from phosphoric acid, at least a quantity of sulfuric acid which substantially satisfies Equation 1 is added to the phosphoric acid.

Mathematical relationships have also been developed to determine how much precipitant containing calcium and fluoride ions should be added to the phosphoric acid. These relationships have been developed specifically for the addition of Synspar, although it is believed that the relationships are useful for the addition of any calcium and fluoride ion containing precipitant. These relationships are based upon the observation that magnesium precipitation from Synspar-treated phosphoric acid is the sum of two components, namely, a natural aging (NA) component and a Synspar-induced (SNS) component. NA precipitation occurs spontaneously, without the addition of Synspar, whereas SNS-induced precipitation is stoichiometrically related to the consumption of fluoride from Synspar addition. The mathematical correlation of MgO precipitation with Synspar addition described herein includes terms both for NA precipitation and SNS precipitation.

The final concentration of soluble magnesium in the acid has been found to correlate with the initial total magnesium in the untreated acid, and with Synspar treatment level as a parameter.

Figure 3:
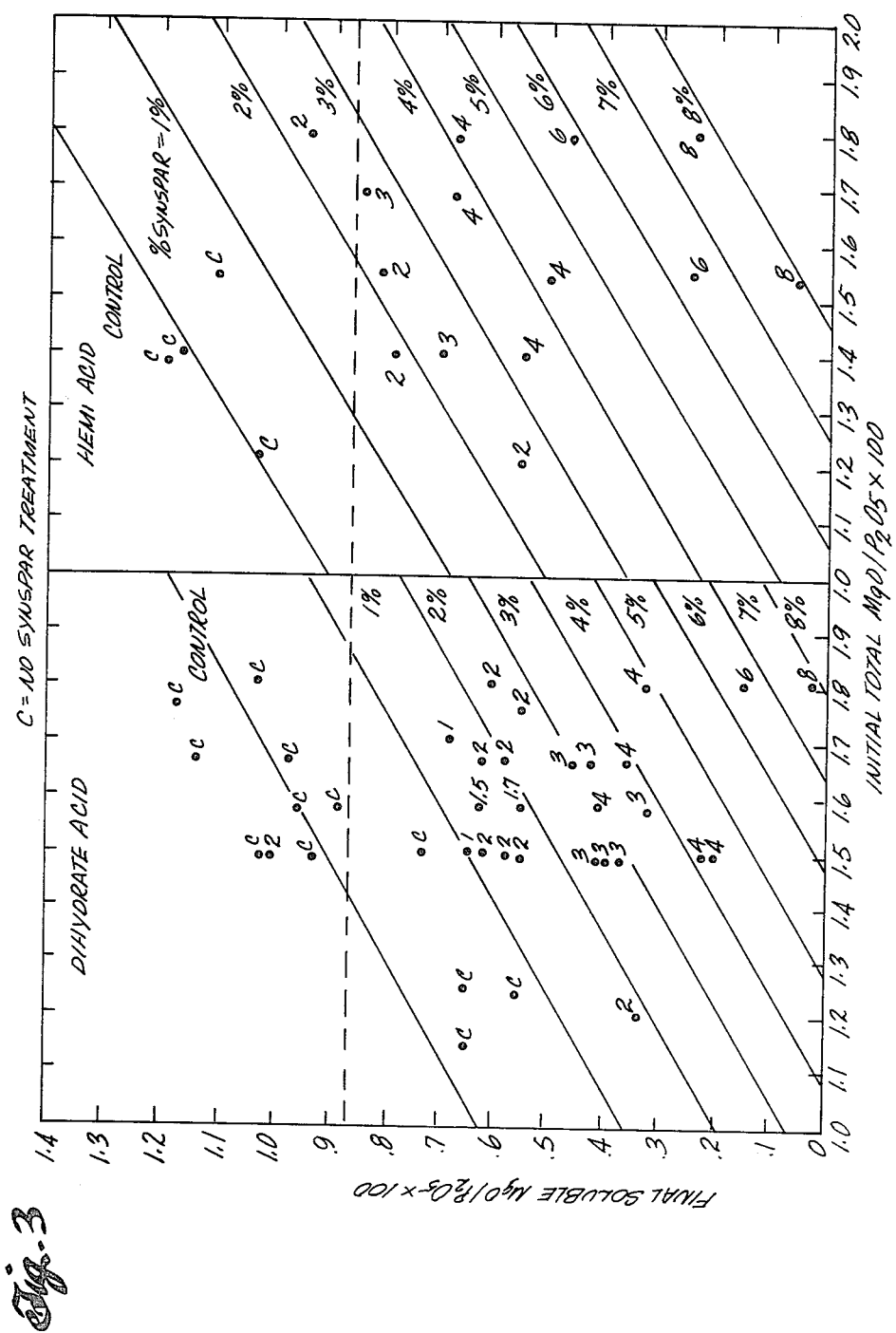
FIG. 3 is a graph which shows a Correlation of Soluble MgO in Aged Synspar Treated to Initial Total MgO for a phosphoric acid concentration of 48% to 54% $P_2O_5$.

Separate correlations (see FIG. 3) were developed for di and hemi acids from 53 Synspar/aging experiments. FIG. 3 graphically represents these correlations. The greater propensity of di vs hemi acid to precipitate magnesium solids by "natural aging" is clearly shown by the lines labeled "C" (control—no Synspar added). Slope of the Synspar parameter lines are nearly equal for di vs hemi acid, indicating that both respond about the same to Synspar treatment.

The Synspar parameter lines were plotted by means of two equations (one for hemi and one for di) generated by non linear regression analysis of the 53 data points.

For dihydrate acid, $$Y = 0.5834X + 0.02038 - 0.2516S^{0.7} \quad (2)$$

and for hemihydrate acid, $$Y = 0.6165X + 0.2722 - 0.2232S^{0.8} \quad (3)$$

where

Y is the final soluble 100[MgO]/[P$_2$O$_5$]

X is the initial total 100[MgO]/[P$_2$O$_5$]

S is the percentage treatment level with Synspar.

Average absolute error of S is within ±0.5 actual %; i.e., the correlation should predict Synspar level to within a half percent of Synspar. If S, in the above equations is set equal to 0, then Y vs X become the "natural aging" curves.

The conventional way to use the MgO correlation equations is to pick a value for X and S, and then calculate the resulting Y.

However, the two equations may be inverted, as shown below, to obtain Synspar level as a function of Y and X. Thus, for dihydrate acid, $$S = \left( \frac{Y - 0.5834\,X - 0.02038}{-0.2516} \right)^{1/0.7} \quad (4)$$

and for hemihydrate acid, $$S = \left( \frac{Y - 0.6165\,X - 0.2722}{-0.2232} \right)^{1/0.8} \quad (5)$$

To calculate the Synspar requirement to make spec, set Y=0.86, pick any desired X and solve for S.

Limitations on the use of the above equations are specified below. Extrapolations should be avoided as they may give false results.

1. 0% ≤ [SNS] ≤ 10%
2. 135° F. < Aging Temp < 160° F.
3. 4 Days ≤ Aging Time
4. 46% ≤ [P$_2$O$_5$] ≤ 54%
5. 2.0% ≤ [H$_2$SO$_4$]final,soluble
6. The equations, which were developed from lab batch test results are believed to be valid as is for a three stage plant-size continuous stirred tank reactor system. Although the 3 stage system is theoretically about 8% less efficient than a batch system of the same retention time, the higher level of agitation in the plant reactor vs lab batch tests is expected to compensate almost exactly for the loss in efficiency due to backmixing in the three stage system.
7. Accuracy in predicting Synspar requirement, by experience, has been ±0.5 weight % Synspar in 12 different cases with both di and hemi acids.

Generally, it has been found that the amount of Synspar added to remove magnesium from phosphoric acid is about 1 to about 5% by weight of the phosphoric acid to be treated.

To insure desired results, it is preferred to add from 106% to 110% of the amount of precipitant determined to be added by the solution by the appropriate equation. If necessary, the amount of sulfuric acid to be added to maintain the desired sulfate content can be determined by the "Sulfuric Acid Predictor Equation" supra.

A highly nutritious animal feed can be prepared from the precipitate separated from the phosphoric acid by combining the precipitate with phosphate rock, water, and a sodium-containing compound to yield a calcine feed mixture, which is then calcined to reduce the fluorine content of the animal feed. The amount of calcium used should be sufficient that the product contains at least 32% by weight calcium so that the product is commercially acceptable as an animal feed. The calcium is provided by the precipitate and the phosphate rock. If necessary, the calcium can be supplemented by the addition of calcium-containing compounds, such as calcium hydroxide and/or calcium carbonate.

Sufficient phosphate is included in the calcine feed mixture so that the product contains at least 14% by weight phosphorus, and preferably at least 18% by weight phosphorus, so the product is commercially acceptable as an animal feed. The phosphorus is provided by both the precipitate and the phosphate rock. Additional phosphorus can be included in the calcine feed mixture by adding phosphoric acid. Analysis of typical phosphate rock is as shown in Table I.

Water is added to the calcine feed mixture so that the feed mixture is sufficiently gummy that it can be made into small BB-size pellets suitable for ingestion by animals, such as chickens. A portion of the water can be provided by phosphoric acid added to the mixture.

It is important to add sodium to the calcine feed mixture so that the fluorine is released during calcination. It has been found that if there is insufficient sodium in the mixture, the fluorine is released at a slow rate. Preferably, sufficient sodium-containing compound is included in the feed-mixture that the product, after calcination, contains from about 4 to about 6% by weight $Na_2O$, and preferably about 5% weight $Na_2O$. The sodium-containing compound can be sodium hydroxide, sodium carbonate, or other economically available sodium-containing compounds.

TABLE I

| ANALYSIS | PHOSPHATE ROCK ANALYSIS, % | |
|---|---|---|
| | TYPICAL | RANGE |
| BPL* | 67.91 | 66.0–69.0 |
| Insol. | 7.1 | 5.0–9.0 |
| $Fe_2O_3$ | 1.04 | 0.9–1.1 |
| $Al_2O_3$ | 1.08 | 0.9–1.5 |
| MgO | 0.37 | 0.2–0.9 |
| CaO | 45.36 | 43.5–46.8 |
| $Na_2O$ | 0.54 | 0.5–0.60 |
| $K_2O$ | 0.10 | 0.1–0.2 |
| F | 3.39 | 3.0–4.0 |
| Organics | 0.25 | 0.2–0.3 |
| $CO_2$ | 3.69 | 3.4–4.5 |
| $SO_4$ | 1.11 | 1.0–1.3 |

Rock contains 12% moisture
*Bone phosphate lime

The calcine feed mixture is granulated and dried to form pellets of desired size and configuration. The pellets are then calcined at a sufficiently high temperature for a sufficiently long time that the phosphorus to fluorine weight ratio of the pellets is at least 100:1, and the pellets contain no more than 0.14% by weight of fluorine. It has been determined that calcination at temperatures of 2400° F. and higher achieves a satisfactory defluorination rate.

The method described herein is an effective and efficient technique for removing impurities from wet process phosphoric acid. It is simple to use, requiring only the addition of calcium fluoride containing solid, and in some cases the addition of sulfuric acid. The calcium fluoride-containing solid can be a waste material with minimal economic value, such as the precipitate obtained by treating phosphoric acid plant pond water with a calcium-containing compound. By use of the equations described herein, it is possible to predict with great accuracy the amount of precipitant and the amount of sulfuric acid which need to be added to phosphoric acid to remove magnesium impurity from the acid.

Furthermore, the precipitate formed in the phosphoric acid can be recovered as a valuable by-product, providing a portion of the feed required for making a commercially valuable, highly nutritious animal feed. These and other features of the invention are demonstrated by the following examples.

EXAMPLE 1

Calcium fluoride sludge was produced in plant equipment using a semi-continuous process. In this procedure pond water and limestone were continuously metered into a prereaction tank with 5–15 minutes retention time. The chemical analysis of the pond waste was about 0.98%, $P_2O_5$; 0.42%, P; 0.34%, $SO_4$; 0.018%, $Fe_2O_3$; 0.037%, $Al_2O_3$; 0.16%, CaO; 0.13%, $SiO_2$; and 0.11%, $Na_2O$. The slurry was pumped to a second reaction tank equipped with an agitator and was then agitated for about 1 to 10 hours. The slurry was then pumped intermittently to a settling tank and allowed to settle for about 5 hours. The underflow sludge containing approximately 50% by weight of fluoride solids was pumped to a storage tank. The product in this storage tank was dried in a convection oven at 105° C. for six hours. The sludge was rewetted to 50% by weight of the solids. A 100–1000 ml sample of wet process phosphoric acid was treated with the dried calcium flouride sludge. The acid and the wetted sludge were placed in polypropylene bottles, the tops were secured and the contents mixed for about 1–2 minutes by shaking. At the end of this time the screw tops were partially opened and the containers placed in a convection heated oven maintained at 115° F.±2° F. Each day thereafter the top on each container was secured and the contents shaken for several minutes. This procedure was repeated 2 to 3 times per day. At the end of five days of aging a sample of 35 gms of the slurry from each container was ultracentrifuged (30,000+ G's) using an International Centrifuge, Universal Model UV, Model 49357M operating at 4000 rpm for 2 minutes. The clear liquor was submitted for chemical analysis by the standard methods used by the Florida Fertilizer Industry. The results are shown in the following Table II.

TABLE II

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_5$ | $Al_2O_3$ | $Na_2O$ | $SiO_2$ | F | $SO_4$ | $CO_2$ |
| Acid[a] Before Treatment | 52.14 | 0.75 | 0.11 | 1.45 | 2.04 | 0.11 | 0.05 | 0.75 | 4.63 | — |
| Dried Fluoride Sludge | 8.91 | 0.17 | 36.31 | 2.57 | 6.37 | 1.36 | 4.37 | 25.00 | 8.71 | 0.51 |
| Acid[a] After Treatment and Five (5) Days Aging at 115° F. | | | | | | | | | | |
| (1) Dosage: 2% by weight and/or mole ratio F/Mg in mixture of 3.51 | 52.13 | 0.34 | 0.053 | 1.06 | 1.64 | 0.086 | 0.042 | 0.53 | 4.60 | — |

TABLE II-continued

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| (2) Dosage: 3% by weight and/or mole ratio F/Mg in mixture of 4.21 | 51.72 | 0.23 | 0.045 | 1.09 | 1.53 | 0.012 | 0.042 | 0.54 | 4.61 | — |
| (3) Dosage: 4% by weight and/or mole ratio F/Mg in mixture of 4.91 | 52.02 | 0.15 | 0.036 | 1.07 | 1.24 | 0.068 | 0.058 | 0.45 | 4.07 | — |
| Acid With No Treatment and Aged for Five (5) Days at 115° F. | 52.75 | 0.61 | 0.048 | 1.05 | 1.87 | 0.11 | 0.017 | 0.55 | 4.59 | — |

(a)After ultracentrifuging to remove solids.

EXAMPLE 2

This example compares the effect of different sources of fluoride added to wet process phosphoric acid to remove magnesium. The sources used were:
(I) Potassium fluoride ($KF\cdot 2H_2O$)
(II) Calcium fluoride sludge, from pond water treatment (about 50% solids, 10% F.)
(III) HF solution (50% aqueous)

Three tests (a, b, and d) were run in duplicate. One (c) was a single run. All were at 160° F. for 30 minutes, using a procedure like that in Example 1.

| Test a | Control |
|---|---|
| Test b | I KF . $2H_2O$ = (7.0/100 g acid) |
| Test c | II Calcium fluoride sludge (14.1 g/100 g acid) |
| Test d | III HF solution (2.98 g/100 g acid) |

Tests b–d were based on 6:1 F:Mg stoichiometry, with estimated 0.5 MgO in the 50% $P_2O_5$ acid.

Three other tests were run in duplicate at 160° F. for 30 minutes.

| Test e | I KF . $2H_2O$ at 160° F. for 30 minutes, 4.67/100 g acid |
|---|---|
| Test f | II CaF sludge 9.38 g/100 g acid, |
| Test g | III 50% aqueous HF - 1.98 g/100 g acid, |

Tests e–g were based on 4:1 F:Mg stoichiometry, with estimated 0.5% MgO in 50% $P_2O_5$ acid.

| The results of the first set of runs are below: | | | | The results of the second set of runs are below: | | | |
|---|---|---|---|---|---|---|---|
| Run | $P_2O_5$ | F | MgO | Run | $P_2O_5$ | F | MgO |
| Feed Acid+ | 51.68 | 1.04 | 0.33 | | | | |
| a | 52.28 | 0.57 | 0.14 | a-2 | 53.00 | 0.51 | 0.18 |
| b | 49.78 | 0.79 | 0.0006 | b-2 | 50.11 | 0.67 | 0.039 |
| c | 50.87 | 0.63 | 0.0009 | c-2 | — | — | — |
| d | 50.74 | 2.03 | 0.24 | d-2 | 51.02 | 2.02 | 0.30 |
| e | 50.04 | 1.62 | 0.22 | e-2 | 50.06 | 1.89 | 0.26 |
| f | 51.36 | 0.68 | 0.002 | f-2 | 51.88 | 0.57 | 0.038 |
| g | 51.66 | 1.33 | 0.10 | g-2 | 51.55 | 1.23 | 0.13 |

+after centrifuging

EXAMPLE 3

A 6 gallon sample of 50% $P_2O_5$ wet process phosphoric acid was put in an oven at 160° F. and let stand for two hours. 4 one gallon jugs were filled with 4200 grams of a supernatant centrifuged sample (centrifuged at 160° F. for 12 minutes at 2000 RPM). The amount of CaF sludge (i.e., "PWS") and the run conditions were as follows:

| Run | Control |
|---|---|
| A | Mechanical agitation only |
| B | 126 gms PwS plus 126 gms $H_2O$ - agitated |
| C | Control shaken twice daily |
| D | 126 gms PwS plus 126 gms $H_2O$ - shake twice daily. |

The analyses of the acids before PWS addition is as follows:

| | $P_2O_5$ | F | $Fe_2O_3$ | $Al_2O_3$ | MgO | $SO_4$ | CaO | $\frac{MgO \times 10^2}{P_2O_5}$ |
|---|---|---|---|---|---|---|---|---|
| Untreated Acid | 49.53 | 2.20 | 1.37 | 2.02 | 0.89 | 4.08 | 1.32 | 1.80 |
| Run A - acid after centrifuge) | 51.99 | 1.20 | 1.24 | 1.43 | 0.61 | 2.71 | 0.15 | 1.17 |

88.69 g of 97.4% $H_2SO_4$ were added to each sample (A, B, C and D) which were agitated well, then prewetted PWS was added to samples B and D.

No immediate reaction was observed when either $H_2SO_4$ or PWS was added to the acid. After 3.5 days, samples A,B,C and D were agitated and then centrifuged for 12 min. at 2000 RPM's at 160° F. The analyses of the samples were as follows:

| Run | $P_2O_5$ | SO | F | $Fe_2O_3$ | MgO | CaO |
|---|---|---|---|---|---|---|
| A | 51.57 | 4.48 | 0.85 | 1.40 | 0.42 | 0.05 |
| B | 51.19 | 2.31 | 0.86 | 1.08 | 0.17 | 0.07 |
| C | 51.54 | 4.64 | 0.80 | 1.86 | 0.39 | 0.04 |
| D | 51.31 | 2.42 | 0.99 | 1.06 | 0.17 | 0.10 |

EXAMPLE 4

In this example the kind and amount of acid and dried fluoride sludge used were the same as that used in Example 1 except that the aging temperature used was 140°±3° F. The technique of shaking the samples each day during aging at 140° F. and the method of centrifugation of the samples after five (5) days of aging was the same as described in Example 1. The clear liquor portion of each sample after centrifugation was submitted for chemical analysis. The results are shown in the following Table III.

The following should be added at the bottom of page 43.

In another version of applicant's invention, precipitant can be added to phosphoric acid before concentration. In this version, precipitant is added to phosphoric acid containing from about 38 to about 46% by weight $P_2O_5$. The acid is then concentrated by the evaporation of water to increase the $P_2O_5$ content by at least 2% by weight into the range of 46 to 54% by weight. Precipitate is allowed to form and is then separated from the concentrated acid. Sulfuric acid can be added to the phosphorus acid either before or after concentration to increase the rate of precipitation. An advantage of this version is that the precipitant can scour particulate buildup from the walls of the condenser used.

an agitator. With agitation 47.1 grams of ground limestone was added directly into the pond water. Following four (4) hours of reaction time at ambient temperature the slurry was vacuum filtered and the wet solids dried overnight at 105° C. The equipment and method for mixing the acid and the various amounts of prewetted fluoride sludge as described in Example 1 was used in this Example 3. The samples were aged for five (5) days at 115° F. and centrifuged in accordance with the method described in Example 1. The clear liquor from each sample was submitted for chemical analyses. The results are shown in the following Table IV.

TABLE IV

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| Parent Acid[a] | 52.14 | 0.75 | 0.11 | 1.45 | 2.04 | 0.11 | 0.05 | 0.75 | 4.63 | — |
| Dried Fluoride Sludge | 17.03 | 0.41 | 49.80 | 1.46 | 4.03 | 1.24 | 1.69 | 25.67 | 3.12 | 0.53 |
| Acid[a] After Treatment and Five (5) Days Aging at 115° F. | | | | | | | | | | |
| (1) Dosage: 2% by weight and/or mole ratio F/Mg in mixture of 3.54 | 52.16 | 0.34 | 0.032 | 1.01 | 1.46 | 0.053 | 0.043 | 0.47 | 4.13 | — |
| (2) Dosage: 3% by weight and/or mole ratio F/Mg in mixture of 4.21 | 52.95 | 0.24 | 0.036 | 1.07 | 1.41 | 0.10 | 0.044 | 0.47 | 4.05 | — |
| (3) Dosage: 4% by weight and/or mole ratio F/Mg in mixture of 4.91 | 52.20 | 0.19 | 0.032 | 1.06 | 1.36 | 0.10 | 0.046 | 0.60 | 3.69 | — |
| Acid With No Treatment and Aged for Five (5) Days at 115° F. | 52.74 | 0.61 | 0.036 | 1.05 | 1.83 | 0.078 | 0.030 | 0.56 | 4.71 | — |

[a]After ultracentrifuging to remove solids.

EXAMPLE 6

In this example the kind and amount of acid and dried

TABLE III

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| Parent Acid[a] | 52.14 | 0.75 | 0.11 | 1.45 | 2.04 | 0.11 | 0.05 | 0.75 | 4.63 | — |
| Dried Fluoride Sludge | 8.91 | 0.17 | 36.31 | 2.57 | 6.37 | 1.36 | 4.37 | 25.00 | 8.71 | 0.51 |
| Acid[a] After Treatment and Five (5) Days Aging at 140° F. | | | | | | | | | | |
| (1) Dosage: 2% by weight and/or mole ratio F/Mg in mixture of 3.51 | 52.09 | 0.32 | 0.037 | 1.20 | 1.56 | 0.099 | 0.059 | 0.49 | 4.44 | — |
| (2) Dosage: 3% by weight and/or mole ratio F/Mg in mixture of 4.21 | 52.34 | 0.21 | 0.044 | 1.23 | 1.45 | 0.063 | 0.066 | 0.49 | 4.44 | — |
| (3) Dosage: 4% by weight and/or mole ratio F/Mg in mixture of 4.91 | 52.10 | 0.11 | 0.045 | 1.10 | 1.19 | 0.052 | 0.060 | 0.43 | 3.74 | — |
| Acid With No Treatment and Aged for Five (5) Days at 140° F. | 51.66 | 0.57 | 0.037 | 1.22 | 1.80 | 0.085 | 0.033 | 0.48 | 4.62 | — |

[a]After ultracentrifuging to remove solids.

EXAMPLE 5

In this example the indicated test was made as follows: A 100–1000 ml sample of the phosphoric acid used in Examples 1 and 2 was treated with the indicated amount of dried calcium fluoride sludge wetted with tap water to give 50% by weight solids. The sludge was prepared in the laboratory on a batch basis by placing a predetermined amount of pond water (3 liters) in a four (4) liter polypropylene beaker equipped with baffles and calcium fluoride sludge used were the same as those used in Example 5 except that the aging temperature used was 140° F.±3° F. The technique of shaking the samples each day during the aging at 140° F. and the method of centrifugation of the samples after five (5) days of aging was the same as described in Example 1. The clear liquor from each sample was submitted for chemical analysis. The results are shown in the following Table V.

TABLE V

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| Parent Acid[a] | 52.14 | 0.75 | 0.11 | 1.45 | 2.04 | 0.11 | 0.05 | 0.75 | 4.63 | — |
| Dried Fluoride Sludge Acid[a] After Treatment and Five (5) Days Aging at 140° F. | | | | | | | | | | |
| (1) Dosage: 2% by weight and/or mole ratio F/Mg in mixture of 3.54 | 52.34 | 0.30 | 0.028 | 1.11 | 1.50 | 0.12 | 0.044 | 0.42 | 4.18 | — |
| (2) Dosage: 3% by weight and/or mole ratio F/Mg in mixture of 4.26 | 52.57 | 0.21 | 0.020 | 1.13 | 1.33 | 0.073 | 0.059 | 0.42 | 3.90 | — |
| (3) Dosage: 4% by weight and/or mole ratio F/Mg in mixture of 4.97 | 52.44 | 0.11 | 0.036 | 1.14 | 1.19 | 0.072 | 0.059 | 0.43 | 3.68 | — |

TABLE V-continued

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_5$ | $Al_2O_3$ | $Na_2O$ | $SiO_2$ | F | $SO_4$ | $CO_2$ |
| Acid With No Treatment and Aged for Five (5) Days at 140° F. | 52.91 | 0.58 | 0.029 | 1.17 | 1.79 | 0.062 | 0.029 | 0.48 | 4.57 | — |

(a) After ultracentrifuging to remove solids.

EXAMPLE 6A

A sample of dried CaF sludge from a plant scale test in which limestone was used to treat pond water gave the following analysis:

| $P_2O_5$ | MgO | CaO | $Fe_2O_5$ | $Al_2O_3$ | $Na_2O$ | $SiO_2$ | F | $SO_4$ | $CO_2$ |
|---|---|---|---|---|---|---|---|---|---|
| 8.91 | 0.17 | 36.31 | 2.57 | 6.37 | 1.36 | 4.37 | 25.00 | 8.71 | 0.51 |

Fresh CaF sludge was made in the laboratory using pond water (0.46% F., 0.79% $P_2O_5$) and limestone (1.33 stoichiometric to the fluorine content of the pond water). The chemical analysis of the dried sludge is shown below

| $P_2O_5$ | MgO | CaO | $Fe_2O_5$ | $Al_2O_3$ | $Na_2O$ | $SiO_2$ | F | $SO_4$ | $CO_2$ |
|---|---|---|---|---|---|---|---|---|---|
| 17.03 | 0.41 | 49.8 | 1.46 | 4.03 | 1.24 | 1.69 | 25.67 | 3.12 | 0.53 |

Both of the above CaF sludges were used to treat fresh evaporate product phosphoric acid. The chemical analysis of the acid as received and after ultracentrifuging (U.C.) to remove the solids is shown in the following table:

| Sample | $P_2O_5$ | MgO | CaO | $Fe_2O_5$ | $Al_2O_3$ | $Na_2O$ | $SiO_2$ | F | $SO_4$ | Solids |
|---|---|---|---|---|---|---|---|---|---|---|
| As Received | 50.18 | 0.75 | 0.72 | 1.38 | 2.01 | 0.62 | 0.62 | 1.91 | 5.61 | 3.89 |
| After U. C. | 52.14 | 0.75 | 0.11 | 1.45 | 2.04 | 0.11 | 0.05 | 0.75 | 4.63 | — |

Summaries of the aging tests are shown in Table VI. In general the results indicate that for equal sludge treatment (mole ratio of F/MgO), and at the same aging temperature there was virtually no difference in the precipitation rates of MgO for the plant sludge and laboratory sludge. However, this series of tests demonstrates the significance of treatment temperature. The two (2) percent treatment using both sludges adjusted the mole ratio of F/Mg in each case to about 3.5 prior to aging. In the laboratory, it has been found that a mole ratio of F/Mg in the sludge treated feed of 3.8-5.0 consistently reduces the weight ratio of $MgO/P_2O_5 \times 10^2$ in the filtered product to 0.85 or less in 2-3 days of aging at 115°-140° F. (see Table III for ratio 4.91).

These results show the effect of F/MgO ratio when treating phosphoric acid with CaF sludge having different weight ratios of Ca/F.

The present process can be used on any wet process phosphoric acd (whether produced with nitric, sulfuric or hydrochloric acid) and can also be useful in removing impurities from such spent industrial phosphoric acid as is produced in the anodizing of aluminum.

TABLE VI

| Material | $P_2O_5$ | MgO | CaO | $Fe_2O_3$ | $Al_2O_3$ | $Na_2O$ | $SiO_2$ | F | $SO_4$ | Solids | $CO_2$ | Crys. $H_2O$ @ 250° C. |
|---|---|---|---|---|---|---|---|---|---|---|---|---|
| Parent Acid | | | | | | | | | | | | |
| As Is[1] | 50.18 | 0.75 | 0.72 | 1.38 | 2.01 | 0.62 | 0.62 | 1.91 | 5.61 | 3.89 | — | — |
| U.C. | 52.14 | 0.75 | 0.11 | 1.45 | 2.04 | 0.11 | 0.05 | 0.75 | 4.63 | — | — | — |
| Bad Synspar[2](DB) | 8.91 | 0.17 | 36.31 | 2.57 | 6.37 | 1.36 | 4.37 | 25.00 | 8.71 | 54.50 | 0.51 | — |
| Good Synspar[3](DB) | 17.03 | 0.41 | 49.40 | 1.46 | 4.03 | 1.24 | 1.69 | 25.67 | 3.12 | — | 0.53 | 5.81 |

| Treated Acid @ 5 Aging Days: Test | $P_2O_5$ | MgO | CaO | $Fe_2O_3$ | $Al_2O_3$ | $Na_2O$ | $SiO_2$ | F | $SO_4$ | % Removal MgO | % Removal $Al_2O_3$ | MgO @ 70% SPA |
|---|---|---|---|---|---|---|---|---|---|---|---|---|
| 1a | 52.75 | 0.61 | 0.048 | 1.05 | 1.87 | 0.11 | 0.017 | 0.55 | 4.59 | 19.44 | 9.21 | 0.81 |
| b | 52.13 | 0.34 | 0.053 | 1.06 | 1.64 | 0.086 | 0.042 | 0.53 | 4.60 | 54.86 | 19.44 | 0.46 |
| c | 51.72 | 0.23 | 0.045 | 1.09 | 1.53 | 0.12 | 0.042 | 0.54 | 4.61 | 69.44 | 24.30 | 0.31 |
| d | 52.02 | 0.15 | 0.036 | 1.07 | 1.24 | 0.068 | 0.058 | 0.45 | 4.07 | 79.86 | 39.13 | 0.20 |
| 2a | 51.66 | 0.57 | 0.037 | 1.22 | 1.80 | 0.085 | 0.033 | 0.48 | 4.62 | 23.61 | 11.00 | 0.77 |
| b | 52.09 | 0.32 | 0.037 | 1.20 | 1.56 | 0.099 | 0.059 | 0.49 | 4.44 | 57.64 | 23.53 | 0.43 |
| c | 52.34 | 0.21 | 0.044 | 1.23 | 1.45 | 0.063 | 0.066 | 0.49 | 4.44 | 72.22 | 29.16 | 0.28 |
| d | 52.10 | 0.11 | 0.045 | 1.10 | 1.19 | 0.052 | 0.060 | 0.43 | 3.74 | 85.42 | 41.69 | 0.15 |
| 3a | 52.74 | 0.61 | 0.036 | 1.05 | 1.83 | 0.078 | 0.030 | 0.56 | 4.71 | 19.44 | 11.25 | 0.81 |
| b | 52.16 | 0.34 | 0.032 | 1.01 | 1.46 | 0.053 | 0.043 | 0.47 | 4.13 | 54.86 | 28.39 | 0.46 |
| c | 52.95 | 0.24 | 0.036 | 1.07 | 1.41 | 0.10 | 0.044 | 0.47 | 4.05 | 68.75 | 31.97 | 0.32 |
| d | 52.20 | 0.19 | 0.032 | 1.06 | 1.36 | 0.10 | 0.046 | 0.60 | 3.69 | 75.00 | 33.25 | 0.25 |
| 4a | 52.91 | 0.58 | 0.029 | 1.17 | 1.79 | 0.062 | 0.029 | 0.48 | 4.57 | 23.61 | 13.55 | 0.77 |
| b | 52.34 | 0.30 | 0.028 | 1.11 | 1.50 | 0.12 | 0.044 | 0.42 | 4.18 | 60.42 | 26.60 | 0.40 |
| c | 52.57 | 0.21 | 0.020 | 1.13 | 1.33 | 0.073 | 0.059 | 0.42 | 3.90 | 72.22 | 35.29 | 0.28 |

TABLE VI-continued

| | | | | | | | | | | | |
|---|---|---|---|---|---|---|---|---|---|---|---|
| d | 52.44 | 0.11 | 0.036 | 1.14 | 1.19 | 0.072 | 0.059 | 0.43 | 3.68 | 85.42 | 41.94 | 0.15 |

| Test* | Type Synspar | Storage Temp. °F. | % SMS Treatment |
|---|---|---|---|
| T1 | "Bad" | 115 | a 0 Control |
| 2 | "Bad" | 140 | b 2 |
| 3 | "Good" | 115 | c 3 |
| 4 | "Good" | 140 | d 4 |

Source
1 Dorr-Oliver Evap. Prod.
2 S.G.S. Tank
3 R&D Batch Produced

EXAMPLE 6B

In removal of metallic ions by CaF containing solids (e.g., synthetic fluorospar), the sulfate ion concentration of the phosphoric acid can have a significant influence. This example illustrates (see Tables VII, VIII and IX) the % removal of magnesium ions (as MgO) and aluminum ions (as $Al_2O_3$) by addition of sulfuric acid (stoichiometric to the fluoride in the Synspar) and synthetic fluorospar ("SNS" or "Synspar" in the Tables) as a 53% aqueous sludge (the "Synspar" analysis in Table VII is on a dry basis) on three samples of 40 to 45% $P_2O_5$ phosphoric acid produced by the "OXY Hemihydrate Process" described in U.S. application Ser. No. 703,208 of Ore et al filed July 7, 1976 (the entire Disclosure of which is incorporated herein). The Tables show the results of adding 2, 3 and 4% SNS (on a dry basis) and aging for 4 days at the indicated temperature (165°, 140° or 120° F.), then filtering to remove precipitated solids. A negative % removal indicates that the acid treated actually picked up metallic ion impurities from the added SNS.

In Table IX, runs 4A and 4B, respectively, show that no difference was observed when the order of addition of the sulfuric acid and the Synspar was reversed.

TABLE VII

Test 1 Hemi/SNS

| Parent Materials | $P_2O_5$ | $Fe_2O_3$ | $Al_2O_3$ | MgO | $SO_4$ | F | $SiO_2$ | $Na_2O$ | Solids | % $H_2SO_4$ | CaO | $CO_2$ |
|---|---|---|---|---|---|---|---|---|---|---|---|---|
| Hemi Acid (As Is) | 40.34 | 1.12 | 1.02 | 0.49 | 3.50 | 1.05 | 0.33 | 0.13 | 0.51 | — | — | — |
| Hemi Acid (UC) | 40.34 | 1.12 | 1.02 | 0.50 | 3.37 | 0.95 | 0.29 | 0.10 | — | — | — | — |
| Synspar (DB) | 17.47 | 1.67 | 3.17 | 0.43 | 4.56 | 23.08 | 4.51 | — | (47.45) | — | 47.20 | 0.64 |
| Plant $H_2SO_4$ | — | — | — | — | — | — | — | — | — | 91.32 | — | — |

| Treated Acid @ 4 Days Aging | $P_2O_5$ | $Fe_2O_3$ | $Al_2O_3$ | MgO | $SO_4$ | F | $SiO_2$ | $Na_2O$ | Solids Before UC | % Removal MgO | % Removal $Al_2O_3$ | MgO @ 70% SPA |
|---|---|---|---|---|---|---|---|---|---|---|---|---|
| @ 140° F. @ 0% SNS (UC) | 41.48 | 1.07 | 1.06 | 0.51 | 3.54 | 0.97 | 0.29 | 0.092 | 1.71 | 0.81 | −1.19 | 0.86 |
| 2 " | 40.38 | 1.06 | 0.97 | 0.43 | 3.01 | 1.18 | 0.32 | 0.061 | 4.73 | 14.52 | 5.14 | 0.74 |
| 3 " | 40.48 | | 0.85 | 0.33 | | | | | | 33.87 | 17.00 | 0.57 |
| 4 " | 39.99 | 1.07 | 0.77 | 0.26 | 2.53 | 1.24 | 0.35 | 0.083 | 7.14 | 47.58 | 23.72 | 0.46 |
| @ 120° F. @ 0 " | 40.71 | 1.05 | 1.04 | 0.52 | 3.39 | 1.01 | 0.28 | 0.069 | 1.41 | −3.23 | −0.79 | 0.90 |
| 2 " | 39.86 | 1.06 | 1.04 | 0.48 | 3.17 | 1.31 | 0.31 | 0.067 | 2.21 | 3.23 | −3.16 | 0.84 |
| 3 " | 39.66 | — | 0.97 | 0.43 | — | — | — | — | — | 12.90 | 3.16 | 0.76 |
| 4 " | 39.59 | 1.08 | 0.88 | 0.36 | 3.01 | 1.32 | 0.35 | 0.069 | 4.27 | 26.61 | 12.25 | 0.64 |

UC = after ultracentrifuging for 5 minutes at 16,000 RPM.
DB = dry basis

TABLE VIII

Test 2 Hemi/SNS

| Material | $P_2O_5$ | $Fe_2O_3$ | $Al_2O_3$ | MgO | *$SO_4$ | F | $SiO_2$ | $Na_2O$ | Solids |
|---|---|---|---|---|---|---|---|---|---|
| Parent Acid (As Is) | 44.28 | 1.21 | 1.02 | 0.56 | 1.13 | 1.24 | 0.42 | 0.16 | 1.42 |
| Parent Acid (U.C.) | 44.73 | 1.21 | 1.03 | 0.56 | 0.45 | 1.02 | 0.34 | 0.08 | — |

| | $P_2O_5$ | $Fe_2O_3$ | $Al_2O_3$ | MgO | *$SO_4$ | F | $SiO_2$ | $Na_2O$ | Solids Before UC | % Removal MgO | % Removal $Al_2O_3$ | MgO 70% @ SPA |
|---|---|---|---|---|---|---|---|---|---|---|---|---|
| Treated Acid @ 4 Days Aging | | | | | | | | | | | | |
| @ 140° F. @ 0% SNS (UC) | 45.54 | 1.16 | 1.07 | 0.59 | 0.65 | 1.08 | 0.35 | 0.09 | 1.51 | −4.00 | −2.17 | 0.91 |
| @ 140° F. @ 2% SNS (UC) | 44.44 | 1.15 | 1.10 | 0.57 | 0.67 | 1.37 | 0.40 | 0.10 | 4.79 | −2.40 | −7.83 | 0.90 |
| @ 140° F. @ 3% SNS (UC) | 44.06 | — | 1.05 | 0.57 | — | — | — | — | — | −3.20 | −3.48 | 0.90 |
| @ 140° F. @ 4% SNS (UC) | 43.74 | 1.17 | 1.00 | 0.56 | 1.43 | 1.37 | 0.40 | 0.07 | 7.49 | −2.40 | 0.43 | 0.90 |
| @ 120° F. @ 0% SNS (UC) | 45.21 | 1.17 | 1.09 | 0.59 | 0.58 | 1.14 | 0.38 | 0.13 | 0.17 | −4.80 | −4.78 | 0.92 |
| @ 120° F. @ 2% SNS (UC) | 44.21 | 1.16 | 1.04 | 0.59 | 0.40 | 1.33 | 0.41 | 0.07 | 2.35 | −6.40 | −2.17 | 0.93 |
| @ 120° F. @ 3% SNS (UC) | 43.54 | — | 1.04 | 0.57 | — | — | — | — | — | −4.80 | −3.91 | 0.92 |
| @ 120° F. @ 4% SNS (UC) | 43.43 | 1.16 | 1.06 | 0.58 | 0.61 | 1.44 | 0.41 | 0.08 | 5.19 | −7.20 | −6.09 | 0.94 |
| Treated Acid @ 4 Days @ 140° F. Plus 2 Days @ 160° F. | | | | | | | | | | | | |
| 0 SNS (UC) | 47.50 | | 1.11 | 0.60 | | | | | | −0.80 | −1.74 | 0.88 |
| 2 SNS (UC) | 45.75 | | 1.04 | 0.57 | | | | | | 0 | 1.30 | 0.88 |
| 4 SNS (UC) | 45.93 | | 1.02 | 0.53 | | | | | | 8.00 | 3.48 | 0.81 |
| Repeat Test Treated Acid @ 4 Days Aging | | | | | | | | | | | | |
| @40° F. @ Control | 45.54 | | 1.09 | 0.59 | 0.57 | | | | | −4.00 | −3.91 | 0.91 |
| 4 SNS/$H_2SO_4$ | 43.77 | | 1.04 | 0.56 | 0.65 | | | | | −2.40 | −3.48 | 0.90 |
| $H_2SO_4$/SNS | 43.77 | | 1.07 | 0.57 | 0.68 | | | | | −4.00 | −6.09 | 0.91 |

TABLE VIII-continued

Test 2
Hemi/SNS

| | | | | | | | |
|---|---|---|---|---|---|---|---|
| [2.5]SHS/H$_2$SO$_4$ | 44.02 | 0.87 | 0.38 | 1.50 | 31.20 | 13.91 | 0.60 |
| [2,5]H$_2$SO$_4$/SNS | 43.80 | 0.91 | 0.41 | 1.53 | 24.80 | 9.57 | 0.66 |
| [3.8]SNS/H$_2$SO$_4$ | 43.23 | 0.82 | 0.33 | 2.46 | 39.20 | 17.39 | 0.53 |
| [3.8]H$_2$SO$_4$/SNS | 43.41 | 0.80 | 0.33 | 2.65 | 39.20 | 20.00 | 0.53 |

*The decrease in SO$_4$ after ultracentrifuging is probably due to removal of calcium sulfate in the acid.

TABLE IX

Test 3
Hemi

| | P$_2$O$_5$ | Fe$_2$O$_3$ | Al$_2$O$_3$ | MgO | SO$_4$ | F | SiO$_2$ | Na$_2$O | Solids |
|---|---|---|---|---|---|---|---|---|---|
| Hemi Acid (As Is) | 41.84 | 0.96 | 1.05 | 0.48 | 2.37 | 1.19 | 0.44 | 0.14 | 0.58 |
| Hemi Acid (UC) | 42.24 | 0.98 | 1.07 | 0.48 | 2.27 | 1.10 | 0.39 | 0.093 | — |

Treated Acid After 4 Aging Days @ 140° F.

| SNS | P$_2$O$_5$ | Fe$_2$O$_3$ | Al$_2$O$_3$ | MgO | SO$_4$ | F | SiO$_2$ | Na$_2$O | Solids Before UC | Removal Al$_2$O$_3$ | Removal MgO | MgO in 70% SPA |
|---|---|---|---|---|---|---|---|---|---|---|---|---|
| 0 (UC) | 42.99 | 1.04 | 1.03 | 0.49 | 2.18 | 1.00 | 0.34 | 0.09 | 0.36 | 5.14 | 0 | 0.80 |
| 2 (UC) | 42.41 | 1.04 | 1.10 | 0.47 | 1.90 | 1.42 | 0.37 | 0.06 | 2.47 | −2.37 | 2.63 | 0.78 |
| 3 (UC) | 41.90 | — | 1.06 | 0.43 | — | — | — | — | — | 0 | 9.65 | 0.72 |
| 4A SNS/H$_2$SO$_4$ | 41.58 | 1.04 | 0.99 | 0.38 | 1.86 | 1.50 | 0.41 | 0.06 | 4.77 | 5.93 | 20.18 | 0.64 |
| 4B H$_2$SO$_4$/SNS | 41.90 | 1.05 | 0.95 | 0.35 | 1.81 | 1.44 | 0.42 | 0.06 | 5.04 | 10.28 | 26.32 | 0.59 |

EXAMPLE 7

Precipitate was obtained from 50% P$_2$O$_5$ dihydrate phosphoric acid, aged at 160° F. for about 4 days. Precipitate was obtained from the same acid by aging it at 160° F. for about 4 days with the addition of 3% by weight Synspar plus an amount of sulfuric acid stoichiometrically equivalent to the fluorine content of the Synspar added. The precipitate formed was washed with citric acid to remove calcium sulfate. In addition, a reagent-grade Ralstonite was formed using reagent-grade chemicals.

All four precipitates, the natural precipitate, the Synspar-induced precipitate, the citrate washed Synspar-induced precipitate, and the reagent Ralstonite, were chemically analyzed, analyzed by X-ray diffraction, and analyzed by infrared. The results are shown in Table X. According to Table X, it is apparent that the Synspar-induced precipitate contains Ralstonite according to the spectrum reported by the Tennessee Valley Authority (T.V.A.).

EXAMPLE 8

Phosphoric produced by a dihydrate acid was treated with 2% by weight Synspar at 30-minute intervals for 3½ hours. After 24 hours the acid was ultra-centrifuged to remove the formed precipitate. The acid was then analyzed. The feed acid was analyzed before ultra-centrifuging, after ultra-centrifuging without aging, and after ultra-centrifuging after 24 hours of aging. The results of the analyses are presented in Table XI. The percent Mg removed is calculated based upon the MgO content of the ultra-centrifuged feed acid.

TABLE X

WATER INSOLUBLE PRECIPITATE FROM 50% P$_2$O$_5$ DIHYDRATE ACID AGED AT 160° F.

| Component, % | Natural Precipitate | Synspar Induced Precipitate | Citrate Washed Synspar Induced Precipitate[a] | Reagent Ralstonite |
|---|---|---|---|---|
| Chemical Analysis | | | | |
| MgO | 16.76 | 6.40 | 14.34 | 15.10 |
| Al$_2$O$_3$ | 27.01 | 9.55 | 23.92 | 24.36 |
| F | 33.86 | 14.18 | 37.63 | 45.28 |
| Na$_2$O | 1.33 | 0.55 | 1.57 | 14.90 |
| Fe$_2$O$_3$ | 0.31 | 0.23 | 0.60 | |
| K$_2$O | 0.45 | 0.24 | 1.11 | |
| CaO | 0.70 | 21.80 | 1.43 | |
| SO$_3$ | 1.95 | 33.99 | 1.53 | 0.1 |
| SiO$_2$ | 19.33 | 4.41 | 16.21 | |
| P$_2$O$_5$ | 0.08 | 0.04 | 0.09 | 1.84 |
| XRD Analysis[d] | | | | |
| Ralstonite (TVA)[b] | 1 | 1 | 1 | |
| Ralstonite (ASTM)[c] | | | | |
| -Quartz | 2 | | 2 | 1 |
| CaSO$_4$ | | 2 | | |
| CaSO$_4$ . O . 5H$_2$O | | 1 | | |
| CaSO$_4$ . 2H$_2$O | | 2 | | |
| AlPO$_4$ | | | | 2 |
| Na$_2$SiF$_6$ | | | | 2 |
| SrHPO$_4$ | | 2 | | |
| (Al,Fe)$_3$(K,Na)H$_{14}$(PO$_4$)$_8$ . 4H$_2$O | | 3 | | |
| Infrared Analysis[d] | | | | |

TABLE X-continued
WATER INSOLUBLE PRECIPITATE FROM 50% P₂O₅ DIHYDRATE ACID AGED AT 160° F.

| Component, % | | Natural Precipitate | Synspar Induced Precipitate | Citrate Washed Synspar Induced Precipitate[a] | Reagent Ralstonite |
|---|---|---|---|---|---|
| Major Bands | | | | | |
| 3350–70 cm$^{-1}$ | (PO$_4$,SO$_4$,H$_2$O) | 1 | 1 | 1 | 1 |
| 1620–60 | (CRYST H$_2$O) | 1 | 1 | 1 | 1 |
| 1100–1140 | (SO$_4$, PO$_4$) | 2 | 1 | 3 | 3 |
| 620–40 | (AlF$_6$) | 1 | 1 | 1 | 1 |

[a] 3% Synspar plus H$_2$SO$_4$ equivalent to Synspar F.
[b] Reference spectrum from J. R. Lehr, Phosphoric Acid, A. V. Slack
[c] Reference spectrum from ASTM 18–1085
[d] 1 = major; 2 = minor; 3 = trace

TABLE XI
DIHYDRATE ACID TREATED WITH 2% BY WEIGHT SYNSPAR ANALYSIS (% BY WEIGHT)

| Sample | Time Since Synspar Addition (minutes) | P$_2$O$_5$ | Fe$_2$O$_3$ | Al$_2$O$_3$ | MgO | SO$_4$ | F | SiO$_2$ | Na$_2$O | CaO | Solids | Mgo/P$_2$O$_5$ (×10$^2$) | % MgO Removed |
|---|---|---|---|---|---|---|---|---|---|---|---|---|---|
| Feed Acid | — | 50.1 | 2.1 | 2.05 | 0.77 | 5.1 | 1.3 | 0.2 | 0.3 | 0.6 | 5.1 | 1.5 | 0 |
| Feed Acid Ultracentrifuged | — | 52.2 | 1.6 | 1.72 | 0.48 | 4.0 | 0.4 | 0.03 | 0.13 | 0.05 | | 0.92 | — |
| Feed Acid Ultracentrifuged After 24 Hours | — | 51.9 | — | 1.69 | 0.45 | — | 0.64 | — | — | — | — | 0.87 | 5.8 |
| #1 | 30 | 51.3 | — | 1.72 | 0.45 | — | 0.60 | — | — | — | — | 0.88 | 4.6 |
| #2 | 60 | — | — | 1.74 | 0.45 | — | 0.53 | — | — | — | — | 0.88 | 4.6 |
| #3 | 90 | — | — | 1.72 | 0.45 | — | 0.76 | — | — | — | — | 0.88 | 4.6 |
| #4 | 120 | — | — | 1.72 | 0.45 | — | 0.46 | — | — | — | — | 0.88 | 4.6 |
| #5 | 150 | — | — | 1.72 | 0.44 | — | 0.70 | — | — | — | — | 0.86 | 6.7 |
| #6 | 180 | — | — | 1.72 | 0.43 | — | — | — | — | — | — | 0.84 | 8.8 |
| #7 | 210 | — | — | 1.69 | 0.44 | — | — | — | — | — | — | 0.86 | 6.7 |
| #8 | 1440 | 51.8 | — | 1.57 | 0.35 | — | 0.46 | — | — | — | — | 0.68 | 26.4 |

From the results of this tests, it can be seen that the addition of Synspar greatly accelerates removal of magnesium from phosphoric acid produced by the dihydrate process. Sample No. 9, which was allowed to age for 24 hours after the addition of 2% Synspar, had 26.4% by weight of the magnesium removed, while feed acid aged for 24 hours without the addition of Synspar only had 5.8% by weight of the magnesium removed. Results presented in Table XI also show that fluorine provided by the Synspar is only slowly released into the phosphoric acid, because the fluoride content of the phosphoric acid remained substantially unchanged during the test.

EXAMPLE 9

Example 8 was repeated, except phosphoric acid produced by hemihydrate process was used, and the acid was treated with 4% by weight Synspar. The results of this test are shown in Table XII. The results show that about 13.5% of the MgO was removed from the feed acid in only 2½ hours, and fluorine was only slowly released by the Synspar into the phosphoric acid.

EXAMPLE 10

Table XIII shows the Synspar requirement calculated via Equations 5 and 6 compared with 12 actual experimental Synspar requirements. The calculated Synspar requirement varies no more than ±0.5 actual weight % Synspar in all 12 cases. Sample calculations are as follows:

Case 1

Given a 50% P$_2$O$_5$ acid containing 2.5% H$_2$SO$_4$, how much sulfuric acid should be added in conjunction with a 4% Synspar treatment? The Synspar contains 23% F.

TABLE XII
HEMIHYDRATE ACID TREATED WITH 4% BY WEIGHT SYNSPAR ANALYSIS (% BY WEIGHT)

| Sample | Time Since Synspar Addition (minutes) | P$_2$O$_5$ | Fe$_2$O$_3$ | Al$_2$O$_3$ | MgO | SO$_4$ | F | SiO$_2$ | Na$_2$O | CaO | Solids | Mgo/P$_2$O$_5$ (×10$^2$) | % MgO Removed |
|---|---|---|---|---|---|---|---|---|---|---|---|---|---|
| Feed Acid | — | 46.0 | 2.5 | 1.14 | 0.84 | 2.77 | 1.02 | 0.28 | 0.2 | 0.61 | 7.6 | 1.83 | — |
| Feed Acid Ultracentrifuged | — | 47.3 | 1.6 | 1.0 | 0.77 | 1.74 | 0.50 | 0.20 | 0.1 | 0.06 | — | 1.63 | — |
| #1 | 30 | 44.5 | — | 0.95 | 0.72 | — | 0.79 | — | — | — | — | 1.62 | 0.61 |
| #2 | 60 | — | — | 0.93 | 0.67 | — | 1.13 | — | — | — | — | 1.50 | 7.98 |
| #3 | 90 | — | — | 0.93 | 0.66 | — | 0.96 | — | — | — | — | 1.48 | 9.20 |
| #4 | 120 | — | — | 0.88 | 0.65 | — | 0.84 | — | — | — | — | 1.46 | 10.43 |
| #5 | 150 | — | — | 0.89 | 0.63 | — | — | — | — | — | — | 1.41 | 13.50 |

TABLE XIII

PREDICTION OF SYNSPAR ADDITION
(Batch Treatment)

| Test | Acid | P$_2$O$_5$ | $\frac{[MgO]}{[P_2O_5]}$ initial, total | Optimum Synspar Requirement Experimental | Calculated |
|---|---|---|---|---|---|
| 1 | Hemi | 52.8 | 0.017 | 3.2 | 3.1 |
| 2 | Di | 48.7 | 0.012 | 0 | 0 |
| 3 | Di | 52.1 | 0.016 | 0 | 0 |
| 4 | Di | 48.1 | 0.018 | 0.9 | 0.7 |
| 5 | Hemi | 47.2 | 0.018 | 3.3 | 3.4 |
| 6 | Hemi | 51 | 0.015 | 2 | 1.69 |
| 7 | Di | 47.9 | 0.017 | 0.75 | 0.3 |
| 8 | Di | 54.0 | 0.018 | 0.5 | 0.5 |
| 9 | Di | 51.1 | 0.017 | 0.75 | 0.3 |
| 10 | Di | 49.2 | 0.017 | 0 | 0.4 |
| 11 | Di | 54.6 | 0.016 | 0 | 0 |
| 12 | Di | 52.9 | 0.015 | 0.5 | 0 |

$$\Delta[H_2SO_4] = 2 - 2.5 + \frac{98}{(38)(100)}(4)(23) = 1.87$$

Therefore, add 1.87% sulfuric acid relative to the total phosphoric acid.

Case 2

Given the conditions of Case 1, except the initial sulfuric acid content is 3.5% and a 2% Synspar is to be used.

$$\Delta[H_2SO_4] = 2. - 3.5 + \frac{98}{(38)(100)}(2)(23) = -0.314$$

$\Delta[H_2SO_4] \leq 0$; therefore, add no $H_2SO_4$.

Synspar Addition

Case 3

Given a 48% dihydrate acid containing an initial total MgO/P$_2$O$_5$ of 0.0192, how much Synspar (23% F.) should be added?

$$[SNS] = ((136.9)(48)/23)(0.0192 - 0.01585) = 0.96$$

i.e., a 0.96% Synspar treatment is required.

Case 4

Given a 48% hemihydrate acid containing an initial total MgO/P$_2$O$_5$ of 0.0192, how much Synspar (23% F.) should be added?

$$[SNS] = ((146)(48)/23)(0.0192 - 0.007153) = 3.67$$

i.e., a 3.7% Synspar treatment is required.

EXAMPLE 11

Figure 2:
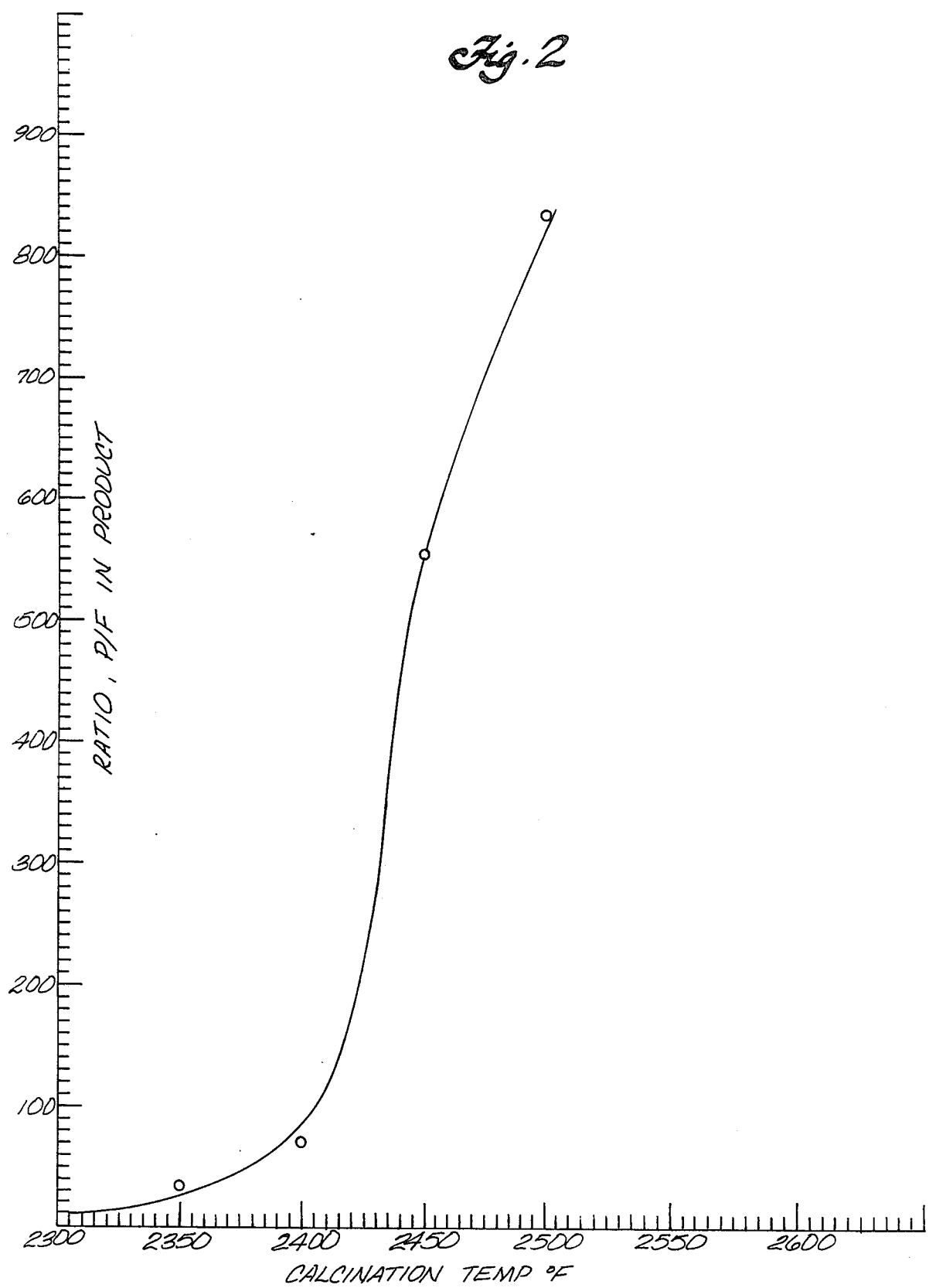
FIG. 2 is a graph of the ratio of phosphorus to fluorine in an animal feed produced in accordance with the present invention versus the calcination temperature used for producing the feed.

A feed phosphate as shown in Table XIV was prepared, and then granulated in a Hobart mixer, dried at 180° F., and screened through a 14-mesh Tyler sieve. The chemical analysis of the dried feed is shown in Table XV. The product was then calcined in the presence of water vapor in a tube furnace to determine the fusion temperature and the defluorination rate. The results are tabulated in Table XVI and summarized in FIG. 2. No fusion was observed at 2550° F., and a P/F ratio in the product of 100 was achieved at about 2420° F. Then, about 30 grams of the feed was calcined at 2450° F. for 20 minutes. During calcination, air saturated with water vapor at 85° F. was admitted into the calciner at a rate equivalent to about 1 ft/sec in the heating zone. The chemical analysis of the calcined product is shown in Table XVII.

EXAMPLE 12

A second feed preparation was made, which is described in Table XVIII, in an attempt to increase the P content in the animal feed product by supplementing part of the P$_2$O$_5$ in the sludge with clarified acid. The granulated and dried product was calcined at 2450° F. for 20 minutes in a tube furnace using the same air flow rate over the samples as described in Example 11. The chemical analysis as shown in Table XIX indicated a product of 17.27% P and a P/F of about 864. A rather small increase in the % P in the product is realized for a significant increase in the ratio of P$_2$O$_5$ from clarified acid to P$_2$O$_5$ contained in the sludge.

Although this invention has been described in considerable detail with reference to certain versions thereof, other versions are possible. For example, the precipitate recovered from the phosphoric acid can be converted into a low analysis fertilizer. This could be done by addition of potash, or preferably by using ammoniation in a "T" reactor.

TABLE XIV

FEED PREPARATION

| | Grams | | | |
|---|---|---|---|---|
| Raw Materials | Weight | P$_2$O$_5$ | CaO | Na$_2$O |
| Drum Sludge | 400 | 138.85 | 13.48 | — |
| Na$_2$CO$_3$ | 104.3 | — | — | 61.07 |
| Phosphate Rock (5.34% SiO$_2$) | 1076.1 | 352.64 | 518.9 | 5.30 |
| Water | 192.0 | | | |
| | 1772.4 | 491.49 | 532.38) | 66.37 |

The material was mixed and granulated in a Hobart Mixer, dried at 180° F. and screened through a 14 mesh (Tyler) screen. The analysis of the dried product is shown in the following table.

TABLE XV

CHEMICAL ANALYSIS OF DRIED FEED PRIOR TO CALCINATION

| P$_2$O$_5$ | CaO | Na$_2$O | F | MR CaO/P$_2$O$_5$ |
|---|---|---|---|---|
| 32.82 | 36.34 | 4.42 | 4.76 | 2.81 |

TABLE XVI

EFFECT OF CALCINATION TEMPERATURE ON DEFLUORINATION*

| Temp., °F. | Time, Min. | P, % | F, % | P/F |
|---|---|---|---|---|
| 2300 | 20 | 16.44 | 1.13 | 14.5 |
| 2350 | 20 | 16.51 | 0.49 | 33.7 |
| 2400 | 20 | 16.59 | 0.20 | 69.1 |
| 2450 | 20 | 16.60 | 0.03 | 553.0 |
| 2500 | 20 | 16.60 | 0.02 | 830.0 |

TABLE XVI-continued
EFFECT OF CALCINATION TEMPERATURE ON DEFLUORINATION*

| Temp., °F. | Time, Min. | P, % | F, % | P/F |
|---|---|---|---|---|
| 2550 | 20 | 16.55 | 0.01 | 1655.0 |

*Air Saturated at 85° F. and Metered Into 1.5" Tube Reactor

TABLE XVII
CHEMICAL ANALYSIS OF PRODUCT CALCINED AT 2450° F. FOR 20 MINUTES

| $P_2O_5$, % | C.I.* | P, % | CaO, % | $Na_2O$ | F, % | P/F | MR* Cao/$P_2$ |
|---|---|---|---|---|---|---|---|
| 38.20 | 1.34 | 16.68 | 41.66 | 4.51 | 0.02 | 833 | 2.76 |

*citric acid insolubles
*mole ratio

TABLE XVIII
FEED PREPARATION

| Raw Materials | Weight | $P_2O_5$ | CaO | $Na_2O$ |
|---|---|---|---|---|
| Drum Sludge (12% $SiO_2$) | 200 | 69.43 | 6.74 | — |
| Clarified 48-52% Acid | 148.4 | 69.43 | 0.37 | — |
| $Na_2CO_3$ | 104.3 | — | — | 61.07 |
| Phosphate Rock (6.45% $SiO_2$) | 1076.1 | 352.64 | 518.90 | 5.30 |
| Water | 160.0 | — | — | — |
|  | 1689.2 | 491.5 | 526.01 | 66.37 |

TABLE XIX
CHEMICAL ANALYSIS OF PRODUCT CALCINED AT 2450° F. FOR 20 MINUTES

| $P_2O_5$, % | C.I. | P, % | CaO, % | F, % | P/F | MR CaO/$P_2O_5$ | $SiO_2$ | $Na_2O$ |
|---|---|---|---|---|---|---|---|---|
| 39.57 | 2.55 | 17.27 | 42.13 | 0.02 | 864 | 2.7 |  | 4.49 |

Later tests made as above but with rocks containing about 7-8% $SiO_2$ fused at about 2400° F., therefore, rocks used in the process should contain less than 7.0% $SiO_2$.

In addition, an acrylamide polymer can be added as a flocculent to the phosphoric acid to be treated to acclerate the precipitation of impurities.

As a further example of possible variations on the processes described herein, the method for removing impurities from phosphoric acid described herein can be used in combination with solvent extraction techniques, such as the techniques described in U.S. Pat. application Ser. No. 840,791, filed Oct. 11, 1977, which is incorporated herein by this reference. Solvent extraction is particularly useful for removing organic contaminants from phosphoric acid. It is possible that some phosphoric acid could be treated by both processes, i.e., addition of a precipitant followed by solvent extraction or solvent extraction followed by addition of a precipitant. The organic material can be removed by means of a polyacrylamide solution. Also, these two techniques can be done in connection with an ion-exhange treatment. It is possible that all three processes, i.e., ion-exchanges, solvent extraction, and addition of a precipitant, could be used in combination to produce a technical grade acid with such low impurity content it might even be suitable as food grade acid.

Therefore, the spirit and scope of the appended claims should not be limited to the versions described herein.

The animal feed and its process of manufacture described herein are the co-invention of the applicant, Harold E. Mills and William S. Newsom, and will be claimed in a later filed application.

What is claimed is:

1. A process for the removal of at least one metallic ion impurity from impure phosphoric acid comprising the steps of:
  (a) adding to the impure phosphoric acid a solid precipitant comprising calcium and fluorine and having a dry basis analysis of at least 20% by weight calcium oxide and at least 19% by weight F, said precipitant prepared by treatment of wet process phosphoric acid plant pond water with a calcium containing compound;
  (b) allowing the formation of a precipitate containing the impurity to yield a purified phosphoric acid; and
  (c) separating at least a portion of the precipitate from the purified phosphoric acid.

2. The process of claim 1 wherein, at least after addition of said precipitant, said impure phosphoric acid is maintained at a temperature in the range of about 115° to 140° F. for sufficient time to permit said precipitation to occur.

3. The process of claim 2 wherein said period of time is in the range of about 2 to 6 days.

4. The process of claim 1 wherein said impure phosphoric acid is a wet process acid analyzing in the range of 38 to 54% by weight $P_2O_5$.

5. The process of claim 4 wherein said impure phosphoric acid is produced by a hemihydrate process.

6. The process of claim 1 wherein said metallic ion impurity comprises divalent magnesium.

7. The process of claim 1 wherein said metallic ion impurity comprises trivalent aluminum.

8. The process of claim 1 wherein sulfuric acid is added to said phosphoric acid in an amount effective to increase the rate of precipitation of said impurity.

9. The process of claim 1 wherein the precipitant contains, on analysis, calcium to F in a molar ratio of about 1:2.

10. A process as claimed in claim 1 in which the solid precipitant comprises calcium fluoride.

11. A process for removal of magnesium ions from impure wet process phosphoric acid, said process comprising:
adding to the acid a precipitant comprising a sludge comprising calcium and fluoride ions obtained by addition of calcium ions to a fluoride containing pond water, to form calcium and fluorine containing solids having a dry basis analysis of at least 20% by weight calcium oxide and at least 19% by weight F, said sludge also containing compounds of phosphorus, magnesium, iron, aluminum, sodium, silica, and sulfur and having a weight ratio of MgO to F in the range of about 1:23 to about 1:260 and a molar ratio of calcium to F of about 1:2;
maintaining said acid, after adding said precipitant, at a temperature in the range of about 115° to 160° F. for sufficient time to permit a precipitate to yield a purified phosphorus acid; and
separating said precipitate from the purified phosphoric acid.

12. The process of claim 11 wherein sulfuric acid is added to said impure wet process phosphoric acid in an amount effective to increase the rate of formation of said precipitate.

13. The process of claim 12 wherein sulfuric acid is added to said impure wet process phosphoric acid in an amount stoichiometric to the fluorine added to the phosphoric acid.

14. A process for removing magnesium ions and aluminum ions from phosphoric acid comprising the steps of:
(a) treating phosphoric acid containing aluminum and magnesium ions by adding to the phosphoric acid a precipitant comprising calcium and fluorine and having a dry basis analysis of at least 20% by weight calcium oxide and at least 19% by weight F, said precipitant prepared by treatment of wet process phosphoric acid plant pond water with a calcium containing compound, in an amount sufficient to yield a molar ratio of F ions to magnesium ions in the treated phosphoric acid of from 3.8:1 to 5:1;
(b) maintaining the treated phosphoric acid at an elevated temperature for a sufficient time to form a precipitate containing magnesium and aluminum; and
(c) separating the formed precipitate from the treated phosphoric acid.

15. The process of claims 14 wherein the treated phosphoric acid is maintained at an elevated temperature in the range of about 115° to 140° F.

16. The process of claim 15 wherein the treated phosphoric acid is maintained at an elevated temperature for a period of time in the range of about 2 to 6 days.

17. The process of claim 14 wherein the treated phosphoric acid is maintained at an elevated temperature for a period of time in the range of about 2 to 6 days.

18. The process of claim 14 wherein sulfuric acid is added to the phosphoric acid in an amount stoichiometric to the fluorine added to the phosphoric acid.

19. The process of claim 14 in which the separated formed precipitate of step (c) comprises Ralstonite.

20. A process for removing impurities from wet process phosphoric acid comprising 38 to 54% by weight $P_2O_5$, 0.3 to 1.75% by weight MgO, as well as sodium, iron, and aluminum, comprising the steps of:
(a) precipitating sludge from a fluoride containing wet process phosphoric acid plant pond water by adding a calcium compound to the pond water to form solids containing calcium and fluorine and having a dry basis analysis of at least 20% by weight calcium oxide and at least 19% by weight F, the sludge comprising calcium and fluoride ions in a molar ratio of calcium to fluoride ions of about 1:2, and also containing compounds of phosphorus, magnesium, iron, aluminum, sodium, silica, and sulfur, and having a weight ratio of MgO to F in the range of about 1:23 to about 1:260;
(b) treating the wet process phosphoric acid by combining the wet process phosphoric acid with a sufficient quantity of sludge for forming a precipitate;
(c) maintaining the treated phosphoric acid at a temperature in the range of about 115° to 140° F. for a period of time in the range of about 2 to 6 days for forming a precipitate comprising sodium, aluminum, and magnesium; and
(d) removing formed precipitate from the treated wet process phosphoric acid.

21. In a hemi-hydrate wet-process for producing phosphoric acid wherein a slurry comprising phosphoric acid and calcium sulfate is formed, and an impure phosphoric acid containing at least 38% by weight $P_2O_5$ is recovered from the slurry, the improvement for removal of at least one metallic ion impurity from the impure phosphoric acid comprising the steps of:
(a) adding a solid precipitant comprising calcium and fluorine to the impure phosphoric acid;
(b) allowing formation of a precipitate containing the metallic ion impurity to yield a purified phosphoric acid; and
(c) separating at least a portion of the precipitate from the purified phosphoric acid.

22. The process of claim 21 wherein said metallic ion impurity comprises divalent magnesium.

23. The process of claim 21 wherein said metallic ion impurity comprises trivalent aluminum.

24. The process of claim 21 wherein, at least after addition of said precipitant, said impure phosphoric acid is maintained at a temperature in the range of about 115 to 140° F. for sufficient time to permit said precipitation to occur.

25. The process of claim 21 wherein sulfuric acid is added to said phosphoric acid in an amount effective to increase the rate of precipitation of said impurity.

26. The process of claim 21 wherein the molar ratio of calcium to fluorine in the precipitant is about 1:2.

27. A process as claimed in claim 21 in which the solid precipitant comprises calcium fluoride.

28. A batch process for reducing the magnesium content of phosphoric acid produced by a dihydrate process and containing from about 46 to about 54% by weight $P_2O_5$, to a low weight ratio of MgO to $P_2O_5$, soluble, which comprises the steps of:
(a) adding to the phosphoric acid a solid precipitant containing calcium and fluorine and having a dry basis analysis of at least 20% by weight calcium oxide and at least 19% by weight F, said precipitant prepared by treatment of wet process phosphoric acid plant pond water with a calcium-containing compound;

(b) maintaining the soluble sulfate content of the phosphoric acid at at least about 2% by weight;

(c) thereafter, aging the phosphoric acid at a temperature from about 135° F. to about 160° F. for up to about four days to allow the formation of a precipitate containing magnesium; and (d) separating formed precipitate from the phosphoric acid to produce a phosphoric acid having a low weight ratio of $MgO:P_2O_5$, soluble.

29. A process as claimed in claim 28 in which the solid precipitant comprises calcium fluoride.

30. A process for the removal of at least one metallic ion impurity contained in impure phosphoric acid which comprises the steps of (a) adding to the impure phosphoric acid a precipitant which is a solids-containing sludge, the sludge containing about 50% by weight water and the solids of the sludge providing a dry basis, by weight analysis of: P, 3 to 10%; Mg, 0.05 to 0.3%; Ca, 20 to 35%; Fe, 0.3 to 3.0%; Al, 1 to 5%; Na, 0.7 to 3.0%; Si, 0.5 to 8.0%; F, 13 to 30% and $SO_4$, 3 to 15%;

(b) allowing the formation of a precipitate containing the metallic ion impurity to form a purified phosphoric acid;

(c) separating at least a portion of the precipitate from the purified phosphoric acid.

31. The process of claim 30 wherein said impure phosphoric acid is a wet process acid analyzing in the range of 38% to 54% by weight $P_2O_5$.

32. The process of claim 31 wherein said impure phosphoric acid is produced by a hemi-hydrate process.

33. The process of claim 30 wherein said metallic ion impurity comprises divalent magnesium.

34. The process of claim 30 wherein said metallic ion impurity comprises trivalent aluminum.

35. The process of claim 30 wherein, at least after addition of said precipitant, said impure phosphoric acid is maintained at a temperature in the range of about 115° F. to 140° F. for sufficient time to permit said precipitation to occur.

36. The process of claim 30 wherein said period of time is in the range of about 2 to 6 days.

37. A process as claimed in claim 30 wherein sulfuric acid is added to the impure phosphoric acid in an amount effective to increase the rate of precipitation of the metallic ion impurity.

38. A process for removing impurities from wet process phosphoric acid comprising 38% to 54% by weight $P_2O_5$, 0.3 to 1.75% by weight MgO, as well as sodium, iron and aluminum, comprising the steps of:

(a) adding to the impure phosphoric acid a precipitant which is a solids containing sludge, the sludge containing about 50% by weight water and the solids of the sludge providing a dry basis, by weight analysis of: P, 3 to 10%; Mg, 0.05 to 0.3%; Ca, 20 to 35%; Fe, 0.3 to 3.0%; Al, 1 to 5%; Na, 0.7 to 3.0%; Si, 0.5 to 8.0%; F, 13 to 30% and $SO_4$, 3 to 15%;

(b) maintaining the treated phosphoric acid at a temperature in the range of about 115° F. to 140° F. for a period of time in the range of about 2 to 6 days to form a precipitate comprising sodium, aluminum, and magnesium; and (c) removing the formed precipitate from the phosphoric acid.

39. A process as claimed in claim 38 in which the wet process phosphoric acid is produced by a hemihydrate process.

40. A process as claimed in claim 38 wherein sulfuric acid is added to the wet process phosphoric acid in an amount effective to increase the rate of formation of the precipitate.

41. A batch process for reducing the magnesium content of phosphoric acid produced by a hemi-hydrate process and containing from about 46% to about 54% by weight $P_2O_5$ so that the weight ratio of MgO to $P_2O_5$, soluble, is no greater than a selected value which comprises the steps of:

(a) adding to the phosphoric acid a solid precipitant containing at least 50% by weight calcium and F prepared by treatment of wet process phosphoric acid plant pond water with a calcium-containing compound, the amount of precipitant added being sufficient to substantially satisfy the equation:

$$[SNS] = \left( \frac{Y - 0.6165 X - 0.2722}{-0.2232} \right)^{1/0.8}$$

where,

[SNS] = the amount of precipitant to be added on a dry basis as a percent by weight of the phosphoric acid to be treated and in the range of 0% $\leq$ [SNS] $\leq$ 10%;

Y = the final ratio of MgO to $P_2O_5$ soluble expressed as 100 [MgO]/[$P_2O_5$]; and X = the initial ratio of MgO to $P_2O_5$, initial total expressed as 100 [MgO]/[$P_2O_5$];

(b) maintaining the soluble sulfate content of the phosphoric acid at at least about 2% by weight;

(c) thereafter, aging the phosphoric acid at a temperature from about 135° F. to about 160° F. for up to about four days to allow the formation of a precipitate containing magnesium; and (d) separating formed precipitate from the phosphoric acid to produce a phosphoric acid having a weight ratio of $MgO:P_2O_5$, soluble, of less than about Y.

42. A process as claimed in claim 41 in which the solid precipitant comprises calcium fluoride.

43. A three-stage continuous-stirred tank process for reducing the magnesium content of phosphoric acid produced by a hemi-hydrate process and containing from about 46% to about 54% by weight $P_2O_5$, so that the weight ratio of MgO to $P_2O_5$, soluble, is no greater than a selected value which comprises the steps of:

(a) adding to the phosphoric acid a solid precipitant containing at least 50% by weight calcium and F prepared by treatment of wet process phosphoric acid plant pond water with a calcium-containing compound, the amount of precipitant added being sufficint to substantially satisfy the equation:

$$[SNS] = \left( \frac{Y - 0.6165 X - 0.2722}{-0.2232} \right)^{1/0.8}$$

where,

[SNS] = the amount of precipitant to be added on a dry basis as a percent by weight of the phosphoric acid to be treated and in the range of 0% $\leq$ [SNS] $\leq$ 10%;

Y = the final ratio of MgO to $P_2O_5$ soluble expressed as 100 $[MgO]/[P_2O_5]$, initial total expressed as 100 $[MgO]/[P_2O_5]$;

(b) maintaining the soluble sulfate content of the phosphoric acid at at least about 2% by weight;

(c) thereafter, aging the phosphoric acid at a temperature from about 135° F. to about 160° F. for up to about four days to allow the formation of a precipitate containing magnesium; and (d) separating formed precipitate from the phosphoric acid to produce a phosphoric acid having a weight ratio of $MgO:P_2O_5$, soluble, of less than about Y.

44. A process as claimed in claim 43 in which the solid precipitant comprises calcium fluoride.

45. A three-stage continuous-stirred tank process for reducing the magnesium content of phosphoric acid produced by a di-hydrate process and containing from about 46% to about 54% by weight $P_2O_5$, so that the weight ratio of MgO to $P_2O_5$, soluble, is no greater than a selected value which comprises the steps of:

(a) adding to the phosphoric acid solid precipitant containing at least 50% by weight calcium and F prepared by treatment of wet process phosphoric acid plant pond water with a calcium-containing compound, the amount of precipitant added being sufficient to substantially satisfy the equation:

$$[SNS] = \left( \frac{Y - 0.5834\,X - 0.02038}{-0.2516} \right)^{1/0.7}$$

where, $[SNS]$ = the amount of precipitant to be added on a dry basis as a percent by weight of the phosphoric acid to be treated and in the range of $0\% \leq [SNS] \leq 10\%$;

Y = the final ratio of MgO to $P_2O_5$ soluble expressed as 100 $[MgO]/[P_2O_5]$; and X = the initial ratio of MgO to $P_2O_5$, initial total expressed as 100 $[MgO]/[P_2O_5]$;

(b) maintaining the soluble sulfate content of the phosphoric acid at at least about 2% by weight;

(c) thereafter, aging the phosphoric acid at a temperature from about 135° F. to about 160° F. for up to about four days to allow the formation of a precipitate containing magnesium; and (d) separating formed precipitate from the phosphoric acid to produce a phosphoric acid having a weight ratio of $MgO:P_2O_5$, soluble, of less than about Y.

46. A process as claimed in claim 45 in which the amount of precipitant added is from about 106% to about 110% of the amount determined to satisfy the equation.

47. The process of claims 28, 41, 43, 45 or 46 in which the step of maintaining the soluble sulfate content comprises adding to the phosphoric acid at least a quantity of sulfuric acid which substantially satisfies the equation:

$$\Delta[H_2SO_4] = 2.0 - [H_2SO_4]_0 \frac{98}{(38)(100)} [SNS] [F]_{SNS}$$

where, $[H_2SO_4]$ = the amount of $H_2SO_4$ to be added to the phosphoric acid expressed as weight percent of the phosphoric acid to be treated;

$[H_2SO_4]_0$ = the initial soluble $H_2SO_4$ as percent by weight of the phosphoric acid to be treated.

$[SNS]$ = the amount of the precipitant to be added on a dry basis as a percent by weight of the phosphoric acid to be treated.

$[F]_{SNS}$ = weight percent of fluorine in the precipitant on a dry basis.

48. A process as claimed in claim 45 in which the solid precipitant comprises calcium fluoride.

* * * * *